United States Patent
Lee et al.

(10) Patent No.: US 6,844,101 B2
(45) Date of Patent: Jan. 18, 2005

(54) SEPARATOR WITH FLUID DISTRIBUTION FEATURES FOR USE WITH A MEMBRANE ELECTRODE ASSEMBLY IN A FUEL CELL

(75) Inventors: Alvin Lee, Vancouver (CA); Joerg Zimmermann, Vancouver (CA); Olen Vanderleeden, Coquitlam (CA)

(73) Assignee: Ballard Power Systems Inc., Burnaby (CA)

( * ) Notice: Subject to any disclaimer, the term of this patent is extended or adjusted under 35 U.S.C. 154(b) by 383 days.

(21) Appl. No.: 10/037,928

(22) Filed: Jan. 4, 2002

(65) Prior Publication Data

US 2003/0129473 A1 Jul. 10, 2003

(51) Int. Cl.[7] ............................. H01M 8/04; H01M 8/24
(52) U.S. Cl. ............................. 429/39; 429/34; 429/35; 429/36
(58) Field of Search ..................... 429/34, 35, 36, 429/37, 38, 39

(56) References Cited

U.S. PATENT DOCUMENTS

| 5,187,025 A | 2/1993 | Kelland et al. ............... 429/33 |
| 5,464,700 A | 11/1995 | Steck et al. .................. 429/30 |
| 5,514,487 A * | 5/1996 | Washington et al. .......... 429/39 |
| 5,981,098 A | 11/1999 | Vitale ........................... 429/34 |
| 6,194,095 B1 | 2/2001 | Hockaday ..................... 429/34 |
| 6,284,401 B1 * | 9/2001 | Marchetti ..................... 429/35 |
| 2002/0022170 A1 | 2/2002 | Franklin et al. .............. 429/34 |

FOREIGN PATENT DOCUMENTS

| JP | 08-045517 | 2/1996 |
| JP | 08-180883 | 7/1996 |
| WO | WO 00/41260 | 7/2000 |
| WO | WO 00/74161 | 12/2000 |
| WO | WO 01/29921 | 4/2001 |

\* cited by examiner

Primary Examiner—Carol Chaney
(74) Attorney, Agent, or Firm—McAndrews, Held & Malloy, Ltd.

(57) ABSTRACT

Electrochemically inactive separators may be employed at the periphery of membrane electrode assemblies in fuel cells (such as solid polymer electrolyte fuel cells) to separate the various fluids within (for example, reactants, coolant). Complex fluid distribution features may be incorporated into these separators, thereby desirably simplifying the design and manufacture of other fuel cell components, such as the flow field plates employed to distribute fluids to the cell electrodes. This is particularly advantageous in fuel cells comprising thin, corrugated flow field plates. The separators may be bonded to the membrane electrode assemblies to form convenient, unitary structures.

25 Claims, 3 Drawing Sheets

SEPARATOR WITH FLUID DISTRIBUTION FEATURES FOR USE WITH A MEMBRANE ELECTRODE ASSEMBLY IN A FUEL CELL

FIELD OF THE INVENTION

The present invention relates to fluid separators for isolating the fluids on each side of a membrane electrode assembly in a fuel cell. More particularly, it relates to separators that attach to the membrane electrode assembly and comprise complex distribution features for the fluids.

BACKGROUND OF THE INVENTION

Fuel cell systems are currently being developed for use as power supplies in numerous applications, such as automobiles and stationary power plants. Such systems offer promise of economically delivering power with environmental and other benefits.

Fuel cells convert reactants, namely fuel and oxidant, to generate electric power and reaction products. Fuel cells generally employ an electrolyte disposed between two electrodes, namely a cathode and an anode. A catalyst typically induces the desired electrochemical reactions at the electrodes. Preferred fuel cell types include solid polymer electrolyte fuel cells that comprise a solid polymer electrolyte and operate at relatively low temperatures.

During normal operation of a solid polymer electrolyte fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

A broad range of fluid reactants can be employed in solid polymer electrolyte fuel cells and may be supplied in either gaseous or liquid form. For example, the oxidant stream may be substantially pure oxygen gas or a dilute oxygen stream such as air. The fuel may be substantially pure hydrogen gas, a gaseous hydrogen-containing reformate stream, or an aqueous liquid methanol mixture in a direct methanol fuel cell. Reactants are directed to the fuel cell electrodes and are distributed to catalyst therein by means of fluid diffusion layers.

Solid polymer electrolyte fuel cells employ a membrane electrode assembly ("MEA"), which comprises the solid polymer electrolyte or ion-exchange membrane disposed between the two electrodes. Each electrode contains a catalyst layer, comprising an appropriate catalyst, located next to the solid polymer electrolyte. The catalyst may be, for example, a metal black, an alloy or a supported metal catalyst, for example, platinum on carbon. The catalyst layer typically contains ionomer, which may be similar to that employed for the solid polymer electrolyte (for example, Nafion®). The catalyst layer may also contain a binder, such as polytetrafluoroethylene. The electrodes may also contain a substrate (typically a porous electrically conductive sheet material) that may be employed for purposes of mechanical support and/or reactant distribution, thus serving as a fluid diffusion layer.

The MEA is typically disposed between two plates to form a fuel cell assembly. The plates act as current collectors and provide support for the adjacent electrodes. The assembly is typically compressed (for example, of order of 70 pounds per square inch (psi) overall) to ensure good electrical contact between the plates and the electrodes, in addition to good sealing between fuel cell components. A plurality of fuel cell assemblies may be combined in series or in parallel to form a fuel cell stack. In a fuel cell stack, a plate is usually shared between two adjacent MEAs, and thus also serves as a separator to fluidly isolate the fluid streams of the two adjacent MEAs.

Further, flow fields are typically incorporated into both surfaces of such plates in order to direct reactants across the electrochemically active surfaces of the fluid diffusion electrodes or electrode substrates. The flow fields typically comprise fluid distribution channels separated by landings. The channels provide passages for the distribution of reactant to the electrode surfaces and also for the removal of reaction products and depleted reactant streams. The landings act as mechanical supports for the fluid diffusion layers in the MEA and provide electrical contact thereto. Ports and other fluid distribution features are typically formed in the surfaces at the periphery of the flow field plates. When assembled into a fuel cell stack, the stacked ports can form internal manifolds for distribution of the fluids throughout the stack. The other distribution features typically are provided to distribute fluids from the ports to the appropriate flow fields. PCT/International Publication No. WO 00/41260, for instance, illustrates flow field plates with flow fields comprising a plurality of straight, parallel channels. The flow fields are fluidly connected to manifold openings in header regions at the periphery of the plates by a series of complex passages formed in the plate surfaces.

Sealing of some sort is generally required around the edges of the MEAs to isolate the different fluids on each side of the MEA. In principle, the membrane electrolyte in the MEA may be oversized and extend significantly beyond the electrochemically active area in order to be employed as a sealing gasket. However, membrane electrolyte material is generally expensive and has relatively poor mechanical properties for this purpose. Thus, it is preferred to employ other means for effecting edge seals.

As an alternative, U.S. Pat. No. 5,464,700 discloses a gasketed membrane electrode assembly that employs gasketing material at the membrane periphery, rather than the membrane itself, as a gasket. The gasketing material may be formed from an elastomeric material suitable for cold bonding or bonding by heat and pressure. A non-hydrophilic thermoplastic elastomer is the preferred gasketing material (for example, Santoprene brand gasketing material).

Further, U.S. Pat. No. 5,187,025 discloses a unitized cell assembly in which the edge of the MEA is extended with a laminated plastic structure to give it strength and rigidity for sealing and support. Therein, the electrolyte membrane is surrounded with a plastic spacer having a thickness closely matched to that of the membrane. A thin, plastic film is bonded with an adhesive layer to both sides of the membrane and spacer so that the film and adhesive bridge the gap therebetween. Porous electrodes with plastic frames are bonded to the composite membrane. The use of this type of structure permits the construction of a rigid cell frame, which can be made the same thickness as the membrane electrode package.

In an effort to further improve fuel cell performance and to reduce the thickness and cost of fuel cell assemblies, there is a trend to use thinner components and especially thinner flow field plates. A particularly thin design for flow field plates employs corrugated flow fields which are characterized by features on one side that are complementary with features on the other side. Corrugated structures are readily formed out of thin metallic sheets by stamping or rolling methods. However, it is not so easy to use such methods to form features on opposing sides of such sheets if the intended features are not substantially complementary. (Instead, engraving techniques may be employed on thicker starting sheet material.) Yet, some desirable corrugated flow field designs involve complex flow distribution and mechanical support features at the fluid inlet and outlet ports on one or both sides of the plate which, in some cases, cross over similarly complex features on the opposite side of the plate. Further, some designs may involve features that interconnect channels within the flow field itself (for example, which interconnect parallel flow channels at their ends so as to form serpentine channels). It might not be possible to form such features on both sides of a plate in a complementary fashion, thereby complicating the fabrication of plates with corrugated flow fields. For this and other reasons, it would be advantageous to be able to design and fabricate the components that distribute fluids to and from the flow fields more independently of the components that comprise the flow fields themselves.

SUMMARY OF THE INVENTION

Fluid distribution features for fluidly connecting manifolds to the flow fields in a fuel cell may be incorporated in an "edge" separator attached to a membrane electrode assembly (MEA) instead of being incorporated in a flow field plate. In this way, the fuel cell may employ flow field plates whose desired design and construction are not so compatible with the design and construction of the edge separator.

The separator is thus employed to separate and distribute fluids at the periphery of a substantially planar MEA in the fuel cell. The MEA typically comprises first and second porous electrodes (for example, anode and cathode) assembled onto opposing major surfaces of a substantially planar membrane electrolyte. The fuel cell also comprises first and second flow field plates adjacent major surfaces of the first and second electrodes, respectively. However, the separator also comprises sealing surfaces for sealing engagement with the periphery of the MEA and with the first and second flow field plates in order to prevent fluids from each side of the MEA from mixing or from escaping from the fuel cell. Further, the separator comprises a first port for providing passage of a first fluid (for example, a reactant such as the fuel) through the separator, and a first set of fluid distribution features for fluidly connecting the first port to the flow field in the first flow field plate yet also for fluidly isolating the first port from the flow field in the second flow field plate.

The separator may also comprise additional ports, for instance, a second port for providing passage of a second fluid (for example, another reactant, such as the oxidant, or a coolant) through the separator, and a second set of fluid distribution features for fluidly connecting the second port to the flow field in the second flow field plate and for fluidly isolating the second port from the flow field in the first flow field plate.

The first set of fluid distribution features may comprise a plurality of channels separated by lands for directing the first fluid to a plurality of channels in the first flow field plate. The second set of fluid distribution features may similarly comprise a plurality of channels separated by lands but for directing the second fluid to a plurality of channels in the second flow field plate. The separator can be substantially planar with these first and second sets of fluid distribution features on opposing major surfaces of the separator.

The separator may be made of a suitable thermoplastic sheet such as a polyimide in which the fluid distribution features may be formed (by molding, engraving and similar forming techniques). Alternatively, the fluid distribution features may be applied to the thermoplastic sheet, for instance, by injection molding a suitable material (for example, silicone elastomer) onto the material.

An assembly in which the separator is attached to the MEA can be prepared by bonding the separator to the periphery of the MEA. The separator may be bonded either directly to the MEA (for example, by bonding to the membrane electrolyte) or indirectly to the MEA (for example, by bonding to first and second thermoplastic sheets which penetrate into and are bonded to the first and second porous electrodes respectively at the periphery of the MEA; such thermoplastic sheets may also be employed to completely encapsulate the separator if desired). In an alternative embodiment, the separator may even be formed from an extension of a fluid diffusion layer in a porous electrode in the MEA. Typically such fluid diffusion layers are similar in size to the active area of the electrode. However, here, the fluid diffusion layer may be extended beyond the active area and may have appropriate port/s and fluid distribution features formed in the extension.

To distribute the fuel cell reactants both to and from their associated flow fields, the separator/MEA assembly may include an additional fluid separator with the two separators sealingly engaged to opposite ends of the MEA. For convenience in assembling a complete fuel cell or fuel cell stack, the separators may also be bonded to adjacent flow field plates.

The aforementioned separators are particularly useful in certain solid polymer electrolyte fuel cell stacks, for instance those employing high aspect ratio, rectangular MEAs and/or corrugated metallic flow field plates.

BRIEF DESCRIPTION OF THE DRAWINGS

FIG. 2b shows a plan view of a simple corrugated flow field plate that can be employed in the assembly depicted in FIG. 2a.

DETAILED DESCRIPTION OF PREFERRED EMBODIMENT(S)

Figure 1A:
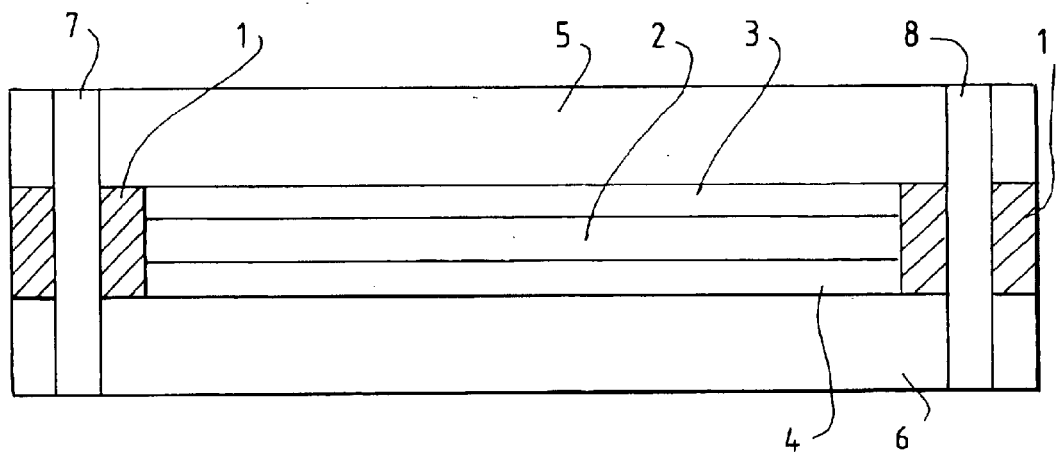
FIG. 1a is a schematic cross-sectional view of a prior art fuel cell assembly in a solid polymer electrolyte fuel cell stack and shows a MEA and associated flow field plates.

A schematic cross-sectional view of a prior art fuel cell assembly in a solid polymer electrolyte fuel cell stack is shown in FIG. 1a. For simplicity, only one MEA is shown along with its adjacent flow field plates. A typical stack would comprise many such MEAs separated by shared bipolar flow field plates in which the fuel and oxidant flow fields would appear on opposite surfaces of each shared plate.

In FIG. 1, the MEA consists of solid polymer electrolyte membrane 2 sandwiched between cathode 3 and anode 4. Flow field plates 5 and 6 are positioned adjacent cathode 3 and anode 4 and provide oxidant and fuel thereto respectively. Gasket 1 provides a seal that prevents mixing of the fuel and oxidant on either side of the MEA and that prevents leaks to the external environment. Manifolds 7 and 8 for directing fuel and oxidants to and from flow field plates 5 and 6 are formed by the alignment of openings provided in gasket 1 and plates 5 and 6. (Fluid distribution features connecting the manifolds to the respective flow fields in plates 5 and 6 are not shown in this schematic.) To effect sealing, gasket 1 may be bonded to the MEA and also compressed between plates 5 and 6 in the vicinity of manifolds 7 and 8.

Figure 1B:
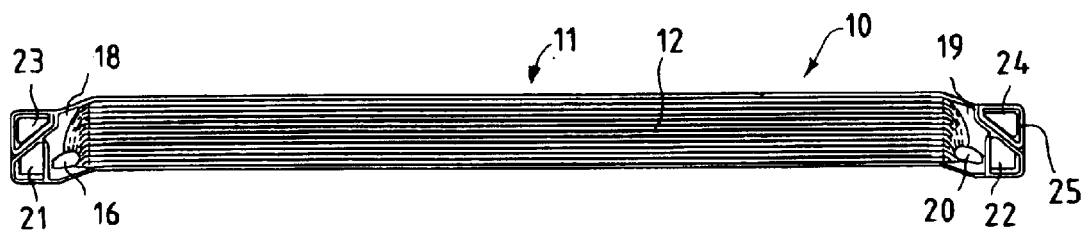
FIG. 1b shows a plan view of a prior art flow field plate for a solid polymer electrolyte fuel cell stack.

FIG. 1b shows a plan view of a representative elongated prior art flow field plate 10 for such a fuel cell stack. The surface shown in FIG. 1b may face and contact the anode side of an MEA and has a central flow field 11 comprising a plurality of parallel substantially straight fuel channels 12 for distributing fuel over the anode surface.

Fuel channels 12 extend substantially between two opposing edges of elongated fuel flow field plate 1. Fuel is admitted at fuel inlet port 16, travels through fuel distribution passages 18, fuel channels 12, fuel distribution passages 19, and exhausts at fuel outlet port 20.

Flow field plate 10 also has oxidant inlet port 21 and oxidant outlet port 22, which are provided to distribute oxidant to and from a corresponding oxidant flow field located on the opposite surface of plate 10. The other surface (not shown) of plate 10 may also comprise a central oxidant flow field similar and complementary to that of fuel flow field 11, namely, a complementary set of parallel substantially straight oxidant channels. However, appropriate oxidant distribution features for connecting oxidant ports 21 and 22 to such an oxidant flow field would not however be complementary to fuel distribution passages 18 and 19. Flow field plate 10 also has coolant inlet port 23 and coolant outlet port 24 for distributing coolant to and from a coolant flow field located within plate 10. Such a coolant flow field may be fabricated by making plate 10 in two pieces with appropriate fluid distribution structures on each surface and then by bonding the two pieces together. Finally, FIG. 1b shows perimeter seal 25 which circumscribes the fuel channel area and the various ports to effect appropriate fluid seals.

Figure 2A:
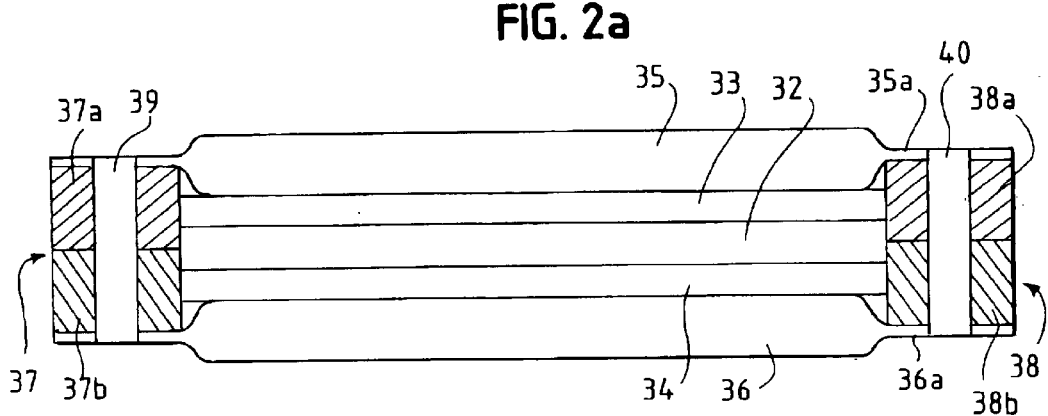
FIG. 2a shows a schematic cross-sectional view of a fuel cell assembly comprising edge separators.

FIG. 2a, on the other hand, shows a schematic cross-sectional view of a fuel cell assembly comprising edge separators in which complex fluid diffusion features, similar in function to passages 18 and 19 in FIG. 1b, reside in the separators. Further, FIG. 2a illustrates a fuel cell construction comprising thin, corrugated, bipolar flow field plates. In FIG. 2a, the MEA components: electrolyte membrane 32, cathode 33, and anode 34 may be similar to those in FIG. 1a. However, flow field plates 35 and 36 are formed from thin sheets and, as shown, are much thinner at the periphery (35a, 36a) than plates 5 and 6 in FIG. 1a. The present separators can also be employed at each end of the MEA. Each separator 37 and 38 is made of two pieces 37a, 37b and 38a, 38b respectively that are bonded to the MEA and to each other in order to effect appropriate fluid seals. Separators 37 and 38 may also be bonded to flow field plates 35 and 36. Fluid diffusion features (not shown in FIG. 1a) connecting manifolds 39 and 40 to the appropriate flow fields in plates 35 and 36 are provided on those surfaces of separators 37 and 38 that are adjacent plates 35 and 36.

Separators 37 and 38 are desirably made of a moldable thermoplastic with mechanical and chemical resistance characteristics that are suitable for use in the fuel cell. For instance, the separators may be made of a phenolic or preferably a polyimide plastic such as Imidex™ of Westlake Plastics Company. Various sealing techniques may be employed to seal and preferably bond such separators to the MEA.

Figure 2B:
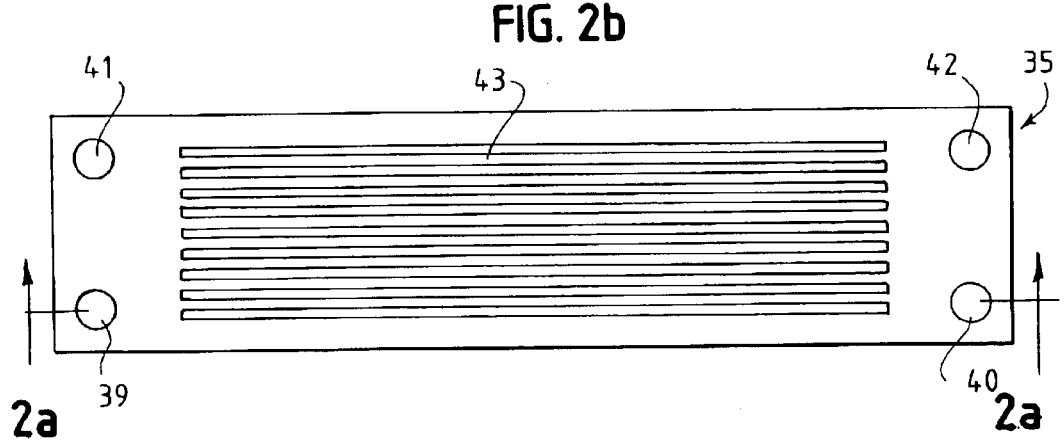
Figure 2C:
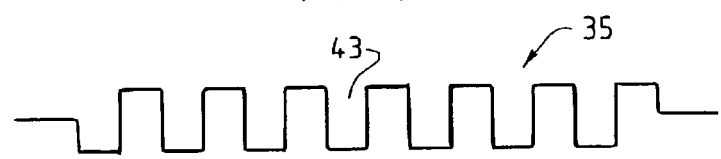
FIG. 2c is a schematic cross-sectional view along section A of the corrugated flow field plate of FIG. 2b.

FIG. 2b shows a plan view of a simple corrugated flow field plate 35, which can be employed in the assembly depicted in FIG. 2a. Since the complex fluid distribution features connecting appropriate internal manifolds to flow field 43 are not in flow field plate 35, the plate may be readily formed from a thin metallic sheet by a stamping process or the like. FIG. 2c shows a schematic cross-sectional view along section A of corrugated flow field plate 35 of FIG. 2b. As depicted, plate 35 comprises four ports (39 and 41 in separator 37 and 40 and 42 in separator 38), which can be employed as fuel and oxidant inlets and outlets. (The embodiment shown in FIGS. 2a, 2b and 2c is not provided with a coolant flow field in plate 35.)

Figure 3:
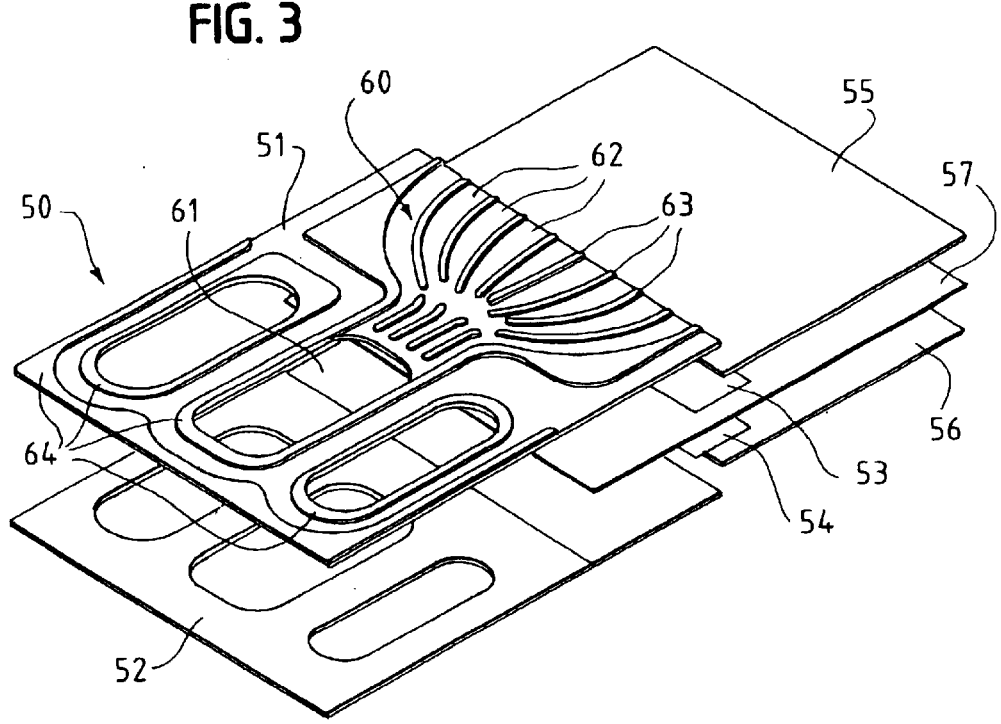
FIG. 3 shows an exploded view of an integrated separator-MEA assembly comprising a two-piece separator laminated to plastic sheets, which in turn are bonded to a MEA.

FIG. 3 shows an exploded view of an integrated separator-MEA assembly comprising a two-piece separator. As depicted, the integrated separator-MEA assembly comprises three ports and is suitable for use in a fuel cell stack employing a coolant flow field. Exploded separator 50 comprises upper and lower thermoplastic pieces 51 and 52 respectively which are bonded together (for example, by thermal bonding). In FIG. 3, the MEA comprises cathode 55, anode 56, and electrolyte membrane 57. Complex fluid distribution features 60 are provided in the surface of piece 51 for connecting oxidant port 61 to the oxidant flow field in an adjacent flow field plate (not shown). Features 60 comprise a plurality of channels 62 separated by lands 63.

Plastic bridging sheet 53 overlaps and is bonded to a portion of upper separator piece 51. Sheet 53 also overlaps and is bonded to a portion of cathode 55, thereby effecting a seal between piece 51 and cathode 55. If bonded thermally, sheet 53 may be caused to penetrate the pores of cathode 55. In a like manner, plastic bridging sheet 54 overlaps and is bonded to lower separator piece 52 and to anode 56. Sheets 53 and 54 are preferably made of a thin thermoplastic film with desirable mechanical, chemical resistance, and bonding characteristics (for example, Kynar®). Additional spacing and sealing surfaces 64 are provided at various locations around the periphery of piece 51 and the ports therein for purposes of spacing from and sealing to an adjacent flow field plate (not shown). A seal between separator 50 and the adjacent flow field plate may be achieved by way of adhesive or compression type seals. For instance, under adequate compressive force, surfaces 64 made of semi-rigid polyimide plastic could be made to press into the surface of an adjacent plate made of softer, deformable expanded graphite in order to effect a compression seal.

As depicted, the embodiment of FIG. 3 is suited for use in a fuel cell stack employing coolant flow fields and thus may not employ thin, corrugated bipolar flow field plates. Still, having certain fluid distribution features in the separator instead of the flow field plates may be advantageous in this embodiment as well. For instance, expanded graphite is commonly considered for use in making flow field plates.

While it is relatively easy to mass produce expanded graphite plates with simple flow field designs (for example, a plurality of straight parallel channels can be roller embossed therein), it can be difficult to also include more complex features (like features 60 in FIG. 3) in the header regions of the expanded graphite plates. Thus, the present separators also offer advantages in fuel cell stacks that do not include corrugated bipolar plates.

Other alternatives to the arrangement shown in FIG. 3 may also be contemplated. For instance, for compression sealing purposes, sealing surfaces 64 and even fluid distribution features 60 may be formed by application of an elastomeric material, such as silicone, onto a semi-rigid polyimide (or other suitable material) base. Further, the elastomeric material may be applied so as to form a surface bridge between the separator and the MEA thereby accomplishing the attachment and sealing functions provided by sheets 53 and 54 in FIG. 3. Elastomeric material may be applied in this manner using a liquid injection molding process. Alternatively, the separator may be butt glued to the MEA instead of using bridging sheet 53 or may be made to overlap an electrode and be bonded thereto.

Figure 4:
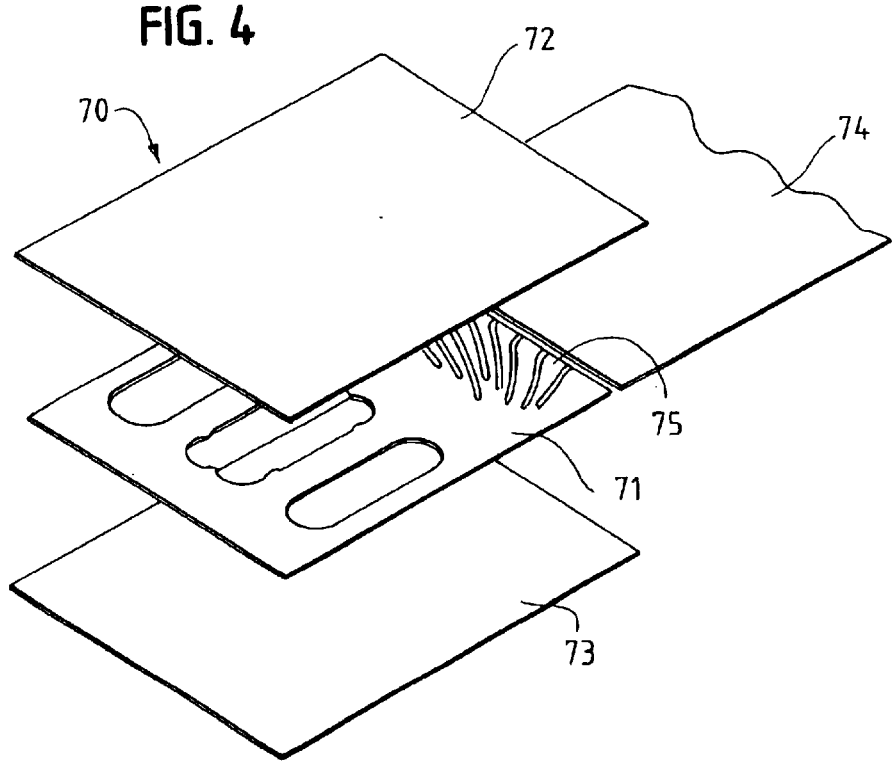
FIG. 4 shows an exploded view of an integrated separator-MEA assembly comprising a single-piece separator that is encapsulated by plastic sheets that are also bonded to a MEA.

Still further, FIG. 4 shows an exploded view of an alternative integrated separator-MEA assembly comprising a single-piece separator 70. Here, separator piece 71 is completely encapsulated by plastic sheets 72 and 73. Sheets 72 and 73 also overlap and are bonded to MEA 74. Sheets 72 and 73 are preferably made of a suitable thermoplastic (for example, Kynar™). The encapsulating and bonding can be achieved by starting with a thinner separator piece 71 than that desired for the final separator thickness and then by overmolding it with sheets 72 and 73 between heated dies in a molding press. The thickness of sheets 72, 73 is selected such that the starting thickness of sheets 72, 73 plus piece 71 is greater than that desired for the final separator thickness. During hot pressing, the overall thickness is reduced to that finally desired. Manifold openings are opened in sheets 72 and 73 to conform to those in the encapsulated piece 71. Also, sheets 72 and 73 are conformed to fluid distribution features 75 and to the sealing surfaces provided (not shown in FIG. 4). Thus, piece 71 may simultaneously be bonded to MEA 74 and completely encapsulated with a protective layer of plastic in one simple operation.

An advantage of this approach is that the thickness of the separator can be custom matched to that of the attached MEA by using a floating platen in the molding press. Thus, the thickness tolerance of manufactured MEAs may be relaxed without negatively affecting alignment of components in the stack. Another advantage is that encapsulating the separator may be sufficient to protect it from the fuel cell environment allowing other less corrosion resistant and less expensive material choices to be contemplated.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A fuel cell comprising a peripheral fluid separator for separating and distributing fluids at the periphery of a substantially planar membrane electrode assembly in a fuel cell, the membrane electrode assembly comprising first and second porous electrodes assembled onto opposing major surfaces of a substantially planar membrane electrolyte, the fuel cell comprising first and second flow field plates adjacent major surfaces of the first and second electrodes, respectively, the peripheral fluid separator comprising: (a) sealing surfaces for sealing engagement with the periphery of the membrane electrode assembly and with the first and second flow field plates; (b) a first port for providing passage of a first fluid through the peripheral fluid separator; and (c) a first set of fluid distribution features for fluidly connecting the first port to the flow field in the first flow field plate and for fluidly isolating the first port from the flow field in the second flow field plate, wherein the peripheral fluid separator is bonded to the periphery of the membrane electrode assembly.

2. The peripheral fluid separator of claim 1 further comprising: (d) a second port for providing passage of a second fluid through the fluid separator; and (e) a second set of fluid distribution features for fluidly connecting the second port to the flow field in the second flow field plate and for fluidly isolating the second port from the flow field in the first flow field plate.

3. The peripheral fluid separator of claim 1 wherein the first set of fluid distribution features comprises a plurality of channels separated by lands for directing the first fluid to a plurality of channels in the first flow field plate.

4. The peripheral fluid separator of claim 2 wherein the second set of fluid distribution features comprises a plurality of channels separated by lands for directing the second fluid to a plurality of channels in the second flow field plate.

5. The peripheral fluid separator of claim 2 wherein the peripheral fluid separator is substantially planar and the first and second sets of fluid distribution features are on opposing major surfaces of the peripheral fluid separator.

6. The peripheral fluid separator of claim 1 wherein the first fluid is a reactant.

7. The peripheral fluid separator of claim 2 wherein the first and second fluids are fuel and oxidant respectively and the first and second electrodes are an anode and a cathode, respectively.

8. The peripheral fluid separator of claim 1 comprising a thermoplastic sheet.

9. The peripheral fluid separator of claim 8 wherein the thermoplastic is a polyimide.

10. The peripheral fluid separator of claim 8 wherein the first set of fluid distribution features is formed in the thermoplastic sheet.

11. The peripheral fluid separator of claim 8 wherein the first set of fluid distribution features is applied to the thermoplastic sheet.

12. The peripheral fluid separator of claim 11 wherein the first set of fluid distribution features comprises silicone.

13. The fuel cell of claim 1 wherein the peripheral fluid separator is bonded to the membrane electrolyte in the membrane electrode assembly.

14. The fuel cell of claim 1 wherein the peripheral fluid separator is bonded to first and second thermoplastic sheets and the thermoplastic sheets penetrate into and are bonded to the first and second porous electrodes respectively at the periphery of the membrane electrode assembly.

15. The fuel cell of claim 14 wherein the peripheral fluid separator is encapsulated by the first and second thermoplastic sheets.

16. The fuel cell of claim 1 wherein the peripheral fluid separator is an extension of a fluid diffusion layer in one of the electrodes.

17. The fuel cell of claim 1 wherein the peripheral fluid separator is bonded to the first flow field plate.

18. The fuel cell of claim 1 wherein the membrane electrode assembly is rectangular.

19. The fuel cell of claim 18 comprising an additional peripheral fluid separator wherein the peripheral fluid separator and the additional peripheral fluid separator are sealingly engaged to opposite ends of the membrane electrode assembly.

20. The fuel cell of claim 1 wherein the fuel cell is a solid polymer electrolyte fuel cell.

21. The fuel cell of claim 1 wherein the flow field plate is corrugated.

22. The fuel cell of claim 21 wherein the flow field plate is metallic.

23. A method of separating and distributing fluids in a fuel cell, the fuel cell comprising a substantially planar membrane electrode assembly having first and second electrodes assembled onto opposing major surfaces of a substantially planar membrane electrolyte, and first and second flow field plates adjacent major surfaces of the first and second electrodes respectively, the method comprising: (a) bonding a peripheral fluid separator to the periphery of the membrane electrode assembly; (b) forming a first port in a the fluid separator to allow a first fluid to pass therethrough; (c) providing a first set of fluid distribution features in the fluid separator to fluidly connect the first port to the flow field in the first flow field plate and to fluidly isolate the first port from the flow field in the second flow field plate; and (d) sealing the peripheral fluid separator to the periphery of the membrane electrode assembly and to the first and second flow field plates.

24. The method of claim 23 further comprising: (e) forming a second port in the peripheral fluid separator to allow a second fluid to pass therethrough; (f) providing a second set of fluid distribution features in the peripheral fluid separator to fluidly connect the second port to the flow field in the second flow field plate and to fluidly isolate the second port from the flow field in the first flow field plate.

25. The method of claim 23 wherein the first set of fluid distribution features comprises a plurality of channels separated by lands for directing the first fluid to a plurality of channels in the first flow field plate.

* * * * *